US011434347B2

(12) United States Patent
Zupan (10) Patent No.: US 11,434,347 B2
(45) Date of Patent: Sep. 6, 2022

(54) PROCESSING METHOD AND PRODUCTS PRODUCED THEREBY

(71) Applicant: ALTERWASTE LTD, Edinburgh (GB)

(72) Inventor: Martina Zupan, Edinburgh (GB)

(73) Assignee: ALTERWASTE LTD, Edinburgh (GB)

( * ) Notice: Subject to any disclaimer, the term of this patent is extended or adjusted under 35 U.S.C. 154(b) by 56 days.

(21) Appl. No.: 16/603,135

(22) PCT Filed: Apr. 5, 2018

(86) PCT No.: PCT/IB2018/052359
§ 371 (c)(1),
(2) Date: Oct. 4, 2019

(87) PCT Pub. No.: WO2018/185699
PCT Pub. Date: Oct. 11, 2018

(65) Prior Publication Data
US 2020/0032035 A1 Jan. 30, 2020

(30) Foreign Application Priority Data

| Apr. 5, 2017 | (GB) | 1705541 |
| Apr. 5, 2017 | (GB) | 1705542 |
| May 15, 2017 | (GB) | 1707755 |

(51) Int. Cl.
| C08L 1/04 | (2006.01) |
| C08K 11/00 | (2006.01) |
| C08J 7/04 | (2020.01) |
| B29B 7/88 | (2006.01) |
| B29B 9/02 | (2006.01) |
| C08J 3/20 | (2006.01) |
| B09B 3/21 | (2022.01) |
| B29K 1/00 | (2006.01) |
| B29K 509/02 | (2006.01) |

(52) U.S. Cl.
CPC .............. *C08K 11/005* (2013.01); *B09B 3/21* (2022.01); *B29B 7/88* (2013.01); *B29B 9/02* (2013.01); *C08J 3/203* (2013.01); *C08J 7/0427* (2020.01); *B29K 2001/00* (2013.01); *B29K 2509/02* (2013.01); *C08J 2301/02* (2013.01); *C08J 2467/04* (2013.01); *C08K 2201/005* (2013.01)

(58) Field of Classification Search
CPC .............. C08K 11/005; C08K 2201/005; C08J 7/0427; C08J 3/203; C08J 2467/04; B09B 3/0033; B29B 7/88; B29B 9/02; B29B 2001/00; B29B 2509/02; B29B 7/905; B29B 7/002; B29B 7/90; B29B 7/94; C08L 1/04; B29K 2001/00; B29K 2509/02
USPC ....................................................... 523/200
See application file for complete search history.

(56) References Cited

U.S. PATENT DOCUMENTS

| 2002/0155143 | A1* | 10/2002 | Campbell | A01N 63/10 424/410 |
| 2003/0209617 | A1* | 11/2003 | MacNeil | A23L 33/17 241/24.12 |
| 2011/0200776 | A1 | 8/2011 | Zikeli et al. | |
| 2014/0011610 | A1* | 1/2014 | Caddell | A63B 57/10 473/377 |
| 2014/0227543 | A1* | 8/2014 | Taleyarkhan | B05D 3/068 428/480 |

FOREIGN PATENT DOCUMENTS

| WO | WO 2014/072913 A1 | 5/2014 |
| WO | WO 2014/091413 A1 | 6/2014 |
| WO | WO 2017/118929 A1 | 7/2017 |

OTHER PUBLICATIONS

"Particle Size/Mesh Conversion Chart" Powder Tech Inc (PTI), 2021. (Year: 2021).*
International Search Report for International Application No. PCT/IB2018/052359, 4 pages, dated Jul. 4, 2018.
Than, M., et al., "Utilization of Eggshell Powder as Excipient in Fast and Sustained Release Acetaminophen Tablets," Mahidol University Journal of Pharmaceutical Sciences, 2012, 39(3-4), 32-38.
Written Opinion of the International Searching Authority for International Application No. PCT/IB2018/052359, 5 pages, as indicated by PCT/ISA/210 (second sheet) dated Jul. 4, 2018.
Notification Concerning Transmittal of International Preliminary Report on Patentability (Chapter I of the Patent Cooperation Treaty) for International Application No. PCT/IB2018/052359, 7 pages, dated Oct. 17, 2019.
Bootklad et al., "Biodegradation of thermoplastic starch/eggshell powder composites", *Carbohydrate Polymers*, 97(2) 23, pp. 315-320, (2013).
Liang et al., "Polymer Material Processing Rheology, Edition 1", *National Defense Industry Press*, p. 108, (2008).
Rahman et al., "Bioderived 'Green' Composite from Soy Protein and Eggshell Nanopowder", *ACS Sustainable Chemistry & Engineering*, 2(10), pp. 2329-2337, (2014).
Siriprom et al., "Characterization of cellulose/calcium carbonate biocomposite film", *Key Engineering Materials*, vol. 675-676, pp. 209-212, (2016).

(Continued)

*Primary Examiner* — Hannah J Pak (74) *Attorney, Agent, or Firm* — Hoxie & Associates LLC (57) ABSTRACT

The present disclosure provides a method of processing shell material. Shell material processed in accordance with the methods disclosed herein may be biodegradable and may further represent a new type of useful material. By way of example, the processed shell material may be useable as a material to make useful materials, items, objects and/or tools.

17 Claims, 5 Drawing Sheets

(56) References Cited

OTHER PUBLICATIONS

Ummartyotin et al., "Eggshell and Bacterial Cellulose Composite Membrane as Absorbent Material in Active Packaging", *International Journal of Polymer Science*, vol. 2016, pp. 1-8 (2016).

* cited by examiner

PROCESSING METHOD AND PRODUCTS PRODUCED THEREBY

CROSS REFERENCE TO RELATED APPLICATIONS

This application is the National Stage Entry under 35 U.S.C. § 371 of International Application No. PCT/IB2018/052359 filed Apr. 5, 2018, which claims priority to GB 1705541.9 filed Apr. 5, 2017, GB 1705542.7 filed Apr. 5, 2017, and GB 1707755.3 filed May 15, 2017, each of which are incorporated herein by reference in their entirety.

FIELD OF THE INVENTION

This disclosure provides methods for processing shell material and novel materials generated thereby. The disclosure concerns a method of creating a new biodegradable material consisting of a biodegradable fibril- or fibre-based binding agent and raw, predominantly calcium carbonate-based material, which acts as an aggregate and provides a mechanical strength.

BACKGROUND OF THE INVENTION

Calcium carbonate is abundant in nature and can be found in various waste by-products (for example waste egg shells, waste sea shells, shrimps etc.) and is often discarded without being used to its full potential.

Owing to current laws and regulations much of these shell waste by-products, for example eggshell waste from egg processors, is disposed in landfill sites. This is problematic because landfill disposal is expensive and environmentally harmful. As a result, potentially high-in-value shell waste by-products are harming the environment. It has been estimated that in the UK, over 12.5 billion avian eggs were consumed in 2016. Only 23% of these eggs are estimated to have been processed. The average weight of an eggshell is 6 g, meaning that over 17 thousand tonnes of eggshell waste was sent to landfills in the UK in 2016.

The present invention may reduce or even eliminate the disposal of shell waste into landfill sites. Any predominantly calcium carbonate-based material or by-product, when ground, can be used in this invention.

SUMMARY OF THE INVENTION

The present disclosure is based on the development of a method for processing shell material.

The disclosed process may be used to render shell material, for example shell waste material, biodegradable.

More specifically, it has been found that a process which comprises granulating shell material and the addition of a binding agent, yields a material which is biodegradable. Further, a material generated using any of the processes described herein has a variety of applications. For example, processed shell material (which processed material may also be biodegradable) may be useful in the manufacture of a variety of different items, objects and/or tools, including, for example, tableware, packaging, insulating material, and/or cosmetic products.

In a first aspect, the present disclosure provides a method of processing shell material, said method comprising the steps of:
  a) granulating shell material;
  b) contacting the granulated shell material with a binding agent; and
  c) drying the granulated shell material/binding agent mix; wherein the product of step (c) is a processed shell material.

The processed shell material (i.e. the product of the method step (c)) may represent a new type of useful material. By way of example, the processed shell material may be useable as a material to make useful materials, items, objects and/or tools.

The processed shell material may be biodegradable.

As such, the method according to the first aspect of this disclosure may provide a method of processing shell waste material to form a biodegradable material, said method comprising the steps of:
  a) granulating the shell material;
  b) contacting the granulated shell material with a binding agent; and
  c) drying the granulated shell material/binding agent mix; wherein the product of step (c) is a biodegradable material.

In a second aspect, the present disclosure provides a useful material and/or a biodegradable material formed or obtainable according to the process of the first aspect of the disclosure.

As stated, a material prepared in accordance with the methods described herein may have a variety of applications and as such, a third aspect provides the use of (i) the material formed via a process according to the first aspect of the invention or (ii) the material according to the second aspect, in the manufacture of objects, items and/or articles.

For example, the material provided by a method described herein may be used in the manufacture of tableware, packaging material, insulation and/or products and/or accessories for cosmetic use.

It should be noted that throughout this specification the term "comprising" is used to denote that embodiments of the invention "comprise" the noted features and as such, may also include other features. However, in the context of this disclosure, the term "comprising" may also encompass embodiments in which the disclosure "consists essentially of" the relevant features or "consists of" the relevant features.

The method of the present disclosure comprises, consists essentially of or consists of two procedural steps: a first step in which shell material (the "aggregate") is granulated; and a second step in which the granulated shell material is contacted with a binding agent. The product of these two steps is a slurry or mix (a granulated shell material/binding agent mix) that can be moulded or manipulated into a particular shape or form. The methods of the present disclosure may further comprise a third step in which the granulated shell material/binding agent mix is dried to form a processed shell material. Advantages associated with the methods described herein include simplicity (the method comprising, consisting essentially of or consisting of only 2-3 steps) and low-cost.

A further advantage of the disclosed methods is that only one aggregate (granulated shell material) is required. This represents an improvement over prior art methods which often require the use of additional aggregates such as filler materials, for example inorganic carbonates, clays or coal residues. Additional components of this type may not be required. Additionally, the methods of this disclosure may not require the use of dispersing agents, such as, for example maleic or citric acids.

The method of the invention may provide a method of processing shell material to form a biodegradable material. The term "biodegradable" used herein means a material that can be broken down in the environment without the need for artificial chemicals or processes. For example, a biodegradable material provided by the methods described herein may be composted and/or disintegrated through the action of a microorganism—for example bacteria, fungi or other biological means. The biodegradable material generated by the methods disclosed herein may be recycled and/or used as a fertiliser.

The term "shell material" embraces, for example eggshell and body shell (for example, exoskeleton) material. Shell material may be characterised by a significant calcium carbonate component, for example shell material for use in a method of this disclosure may contain at least about 30, 40, 50, 60, 70, 80, 90, 95, 99 or 100% calcium carbonate. Useful shell material may not comprise or include synthesised forms of calcium carbonate, natural ground calcium carbonate or surface modified calcium carbonate. In the context of this disclosure, the term "about" may refer to +/−1, 2, 3, 4 or 5% calcium carbonate content in any given type of shell material. The term shell material may include, for example shell waste. This includes waste shell material from eggs (eggshell waste), crustaceans and molluscs, including, for example langoustines, prawns, oysters, mussels, snails and the like. Useful eggshell may be derived from the eggs of any egg-laying animal. As stated, the eggshell may comprise (or have a substantial) calcium carbonate content. Typically the eggshell is from avian or reptilian eggs. Usually the eggshell is from avian eggs, preferably from poultry. The term "poultry" used herein defines any domesticated bird kept for their eggs, meat or feathers. Non-limiting examples include chicken, duck, ostrich, goose, rhea and quail.

Body shell may be obtained from any animal with an exoskeleton. Useful body shell may be obtained from the exoskeleton of water-dwelling crustaceans or water-dwelling molluscs, often referred to as shellfish. The term "seashells" is used to define the exoskeletons of water-dwelling molluscs, therefore seashells lie within the scope of the term "body shell" as used herein. Non-limiting examples of such water-dwelling crustacea and molluscs include lobster, crab, crayfish, prawn (also known as shrimp), oyster, mussel, clam, whelk and winkle. The body shells of land-dwelling crustaceans and molluscs may also be used, a non-limiting example being land snail shells. Usually, the body shell is from the exoskeleton of a crustacean, typically a lobster.

In preferred embodiments, the shell material comprises eggshell or body shell from langoustine. Preferably, said eggshell is from avian eggs.

Shell material for use in the methods described herein may comprise one or more different types of shell material. For example, the shell material may consist essentially (or consist) of eggshell material only or may comprise a combination of eggshell material and body shell material.

The shell material may be waste shell material. For example, the shell material may comprise eggshell waste.

The method according to the first aspect requires that the shell material (for example eggshell waste) is subjected to a process or protocol which reduces the shell material to granules. In other words, shell material may be processed by granulation. Thus, the shell material is "granulated". Granulated shell material may otherwise be referred to as "particulate" in nature. The disclosed methods may require the use of granulated shell material with a particular granule size or range of sizes. Accordingly, the particles of the granulated shell material (or granules) may (before step (b) of the disclosed method) be separated or sorted into different granule or particle sizes. Any step of separating or sorting granulated shell material may be conducted using a sieve type device with a mesh allowing particles of a specific (pre-determined) size to pass therethrough.

The granulation step may provide granulated shell material comprising granules or particles of shell which are between about 1 μM (i.e. 1 micron) and about 1000 μM (i.e. 1000 microns) in size (for example, maximum diameter or length of particle). A particle size may otherwise be referred to as a "particle grade". For example, granulated shell material may comprise particles or granules which have a maximum size of about 5 μm, 10 μM, 15 μM, 20 μM, 25 μM, 30 μM, 35 μM, 40 μM, 45 μM, 50 μM, 55 μM, 60 μM, 65 μM, 70 μM, 75 μM, 80 μM, 90 μM, 100 μM, 150 μM, 200 μM, 250 μM, 300 μM, 350 μM, 400 μM, 450 μM, 500 μM, 550 μM, 600 μM, 650 μM, 700 μM, 750 μM, 800 μM, 850 μM, 900 μM or 950 μM. The methods disclosed herein may not use granulated shell material with a particle size (for example diameter or length) of less than 1 μM. The granulated shell material may comprise a range of particle or granule sizes. By way of example, granulated shell material (for example shell waste) may comprise particles or granules with the following dimensions (the size referring to the diameter or length of a particle or granule within the granulated shell):

(i) <53 μM
(ii) 54-74 μM;
(iii) 75-124 μM;
(iv) 125-249 μM;
(v) 250-499 μM; or
(vi) >500 μM.

The granules and/or particles of the granulated shell material may all be less than 200 μM in size.

The granules and/or particles of the granulated shell material may all have a size which is within the range 54-249 μM.

Thus a granulated shell preparation for use in any of the methods described herein may comprise granules or particles of a single uniform size (where the size of any given granule or particle is substantially the same to within some pre-determined tolerance—for example+/−1 μM, 2 μM, 3 μM, 4 μM, 5 μM, 6 μM, 7 μM, 8 μM, 9 μM, 10 μM, 15 μM, 20 μM, 25 μM, 30 μM, 35 μM, 40 μM, 45 μM or 50 μM). Alternatively, a granulated shell preparation for use in the any of the methods described herein may comprise granules or particles of a range of different sizes. As stated above, the range of particle or granule size may extend from a pre-determined lower limit to a pre-determined upper limit. One of skill will appreciate that the required particle or granule size may depend on the desired properties of the biodegradable material—for example a material with a smooth feel may require a relatively small granule (or particle) size (for example shell material that has been granulated to a particle size of 53 μM or less) whereas a biodegradable material with a coarse or rough feel may require a relatively large granule size (for example shell waste that has been granulated to a particle size of 54 μM or more).

The binding agent is an agent that holds the granulated shell material together. The binding agent may comprise some form of biodegradable fibril and/or fibre-based material. As stated, the term "biodegradable" used herein defines a substance capable of decomposition by living organisms. By "fibril" is meant a thin, threadlike structure. Natural fibril or fibre-based binding agents may be found in nearly all living organisms and are abundant renewable resources. Non-limiting examples of biodegradable fibres include cellulose, chitin/chitosan, collagen, wool and silk. The binding agent may be or comprise cellulose. For example, the binding agent may comprise "nanocellulose". The binding agent may comprise cellulose microfibers/fibrils (CMF), cellulose nanofibers/fibrils (CNF), nanocrystalline cellulose, bacteria nanocellulose and/or some combination thereof.

The binding agent may be prepared for use as a solution (or composition) comprising the binding agent and a diluent or excipient. For example, the binding agent may be prepared as a 0.1%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 96%, 97%, 98%, 99% solution—that is an amount of binding agent (n parts) mixed with an amount of diluent or excipient (100-n parts). For example, the binding agent may be prepared as a 1% solution—that is 1 part binding agent mixed or combined with 99 parts diluent or excipient. The prepared binding agent solution (composition or mix) may be referred to as a binding agent stock solution.

The step of contacting granulated shell waste with a binding agent, may comprise contacting the granulated shell waste with an amount of a binding agent stock solution.

The step of contacting granulated shell waste with the binding agent may be conducted according to some predetermined ratio, wherein the ratio is calculated according to the mass of the material used (i.e. by weight). For example the granulated shell waste and binding agent (which may optionally be provided in the form of a binding agent stock solution) may be combined as follows:

(i) 1 part granulated shell waste to 1 part binding agent;
(ii) 1 part granulated shell waste to 2 parts binding agent;
(iii) 1 part granulated shell waste to 3 parts binding agent;
(iv) 1 part granulated shell waste to 4 parts binding agent;
(v) 1 part granulated shell waste to 5 parts binding agent;
(vi) 1 part granulated shell waste to 6 parts binding agent;
(vii) 1 part granulated shell waste to 7 parts binding agent;
(viii) 1 part granulated shell waste to 8 parts binding agent;
(ix) 1 part granulated shell waste to 9 parts binding agent; or
(x) 1 part granulated shell waste to 10 parts binding agent.

Alternatively, the granulated shell waste and binding agent (which may optionally be provided in the form of a binding agent stock solution) may be combined as follows:

(i) 1 part granulated shell waste to 1 part binding agent;
(ii) 2 parts granulated shell waste to 1 part binding agent;
(iii) 3 parts granulated shell waste to 1 part binding agent;
(iv) 4 parts granulated shell waste to 1 part binding agent;
(v) 5 parts granulated shell waste to 1 part binding agent;
(vi) 6 parts granulated shell waste to 1 part binding agent;
(vii) 7 parts granulated shell waste to 1 part binding agent;
(viii) 8 parts granulated shell waste to 1 part binding agent;
(ix) 9 parts granulated shell waste to 1 part binding agent; or
(x) 10 parts granulated shell waste to 1 part binding agent.

The diluent or excipient used to prepare the binding agent (stock) solution may comprise a "flow agent". The flow agent may be any solvent suitable for contacting granulated shell material with a binding agent. Non-limiting examples include water and alcohols (for example, ethylene glycol, diethylene glycol, glycerine and ethanol). In preferred embodiments, the flow agent is water. Use of a flow agent is advantageous because it allows the shell material to disperse effectively throughout the binding agent. The term "stock solution" is used herein to define a liquid in which a known amount of material (for example, binding agent), is dispersed. Some of this material may dissolve to form a solute. However, it is not a requirement for such a material to be dissolved into solution. Some of the material may be suspended in the solvent, as a suspension.

Preferably, the binding agent is added to the flow agent to form a composition (also known as a stock solution). The granulated shell material is then added to this composition and contacted with the binding agent. Typically, the composition comprising the binding agent/flow agent mix is a suspension. The granulated shell material is then added to this suspension and contacted with the binding agent. In certain embodiments, the granulated shell material is prepared as a suspension, often in a flow agent, before it is contacted with the binding agent. In certain embodiments, both the granulated shell material and the binding agent are prepared as suspensions, often in flow agents, before they are brought together.

As stated, the granulated shell material may comprise, consist essentially of or consist of granulated eggshell and the binding agent may comprise, consist essentially of or consist of (nano)cellulose microfibers/fibrils.

Again, one of skill will appreciate that the desired final properties of the biodegradable material may determine the exact amounts of granulated shell material and binding agent to be used. For example, a biodegradable material that is malleable, flexible and/or mouldable may comprise more parts binding agent than granulated shell material. In contrast, a biodegradable material that is ridged and/or brittle may comprise more parts granulated shell material than binding agent.

The inventor has discovered that a biodegradable material with more parts granulated shell material (i.e. more calcium carbonate) than binding agent, may be stronger and a ratio of about (+/−0.5-1) 3 parts granulated shell material to 1 part binding agent yields a versatile biodegradable material.

The granulated shell material is contacted with the binding agent. For example, the granulated shell material may be added to or dispersed within, the binding agent. The step of contacting the granulated shell waste with the binding agent may be achieved by any suitable means, including mixing (the granulated shell waste and binding agent) by hand and/or with the use of a mechanical mixer. The step of contacting the granulated shell waste and the binding agent may be achieved using a frequency based shaker.

A biodegradable material generated or produced according to a method described herein may be somewhat hydrophilic. A hydrophobic coating may be applied to the biodegradable material. For example, the biodegradable material may be provided with a layer or coating of a hydrophobic biodegradable material—for example a bioplastic (for example, polylactic acid PLA).

The methods described herein may comprise a moulding step—that is a step in which the processed shell material is shaped in some way. The step of moulding the processed shell material may take place before and/or during the drying process of step (c).

The processed shell waste may be moulded into any suitable form—for example sheets (of any suitable size or thickness) or into 2D or 3D shapes—for example blocks, spheres, alpha/numeric characters and the like. The processed shell waste may be moulded or shaped into plates (or some other form of tableware), utensils, tools, packaging, cosmetic goods, pads etc.

The step of drying the processed shell material may comprise air, heat and/or freeze drying. Where the drying step comprises heat, the material to be dried may be placed into an oven and subjected to a temperature of about 20° C., 30° C., 40° C., 50° C., 60° C., 70° C., 80° C., 90° C. or 100° C. for a period of time suitable to dry the material.

Additionally, or alternatively, the material to be dried may be placed in a vacuum to remove moisture.

Further, the drying process may comprise pressing (a "pressure treatment") or moulding the material under pressure to remove moisture.

Material to be dried may be further subjected to moisture removal by osmosis or diffusion where the relatively moist material (to be dried) is placed on a second relatively dry and absorbent material. Under these conditions, moisture from the material to be dried may be taken up by the second and relatively dry/absorbent material.

Material to be dried may be pressed/subjected to pressure treatment and then subjected to further moisture removal by osmosis/diffusion. Drying under these conditions may prevent the material from curling and/or cracking as it is dried.

Where the drying step comprises freeze drying, the granulated shell/binding agent mix may be frozen and then subjected to freeze drying.

Drying by freeze drying produces a light, "fluffy" material. Material of this type may find application as an insulating material, as for use in the cosmetic industry (as a product application/removal pad or the like) or as protective packaging (replacing non-biodegradable packaging materials such as foam pellets, Styrofoam, polystyrene and the like).

Thus in one aspect, the disclosure provides a method of processing shell material to provide an insulating material; said method comprising the steps of:
  a) granulating shell material;
  b) contacting the granulated shell material with a binding agent; and
  c) freeze drying the granulated shell material/binding agent mix,
wherein the product of step (c) is an insulating material.

Insulating material prepared according to the abovementioned method may also be biodegradable.

The disclosure further provides insulating material obtainable by the described method of processing shell material to provide an insulating material.

The biodegradable material may be coloured or dyed—that is to say, as it is processed, it is subjected to a step in which a dye or colorant is added.

The dye or colorant may be added to the shell material before, during or after granulation.

Additionally, or alternatively, a colorant or dye may be added to the binding agent before during or after its preparation for use.

Additionally, or alternatively, a colorant or dye may be added to the granulated shell/binding agent mix.

Additionally, or alternatively, a colorant or dye may be added or applied to the dried (biodegradable) material (in other words, a colorant or dye may be added to the processed shell material after the completion of any drying step).

The inventor has discovered that when a colorant or dye is added to processed shell waste after drying, the colour remains vibrant and bold. Adding the colorant or dye prior to the drying step can lead to a fading, dulling or alteration of the colour or dye.

In certain embodiments, a hydrophobic coating and a colorant are used. Preferably, the hydrophobic coating is applied after the addition of the colorant or dye.

Based on the above, the disclosure provides:

A method of processing shell material to provide a moulded biodegradable material; said method comprising the steps of:
  a) granulating shell material;
  b) contacting the granulated shell material with a binding agent comprising nanocellulose; and
  c) moulding and drying the granulated shell waste/binding agent mix,
wherein the product of step (c) is a moulded biodegradable material.

A method of processing eggshell material to provide a biodegradable material; said method comprising the steps of:
  a) granulating eggshell material;
  b) contacting the granulated eggshell material with a binding agent comprising nanocellulose; and
  c) drying the granulated eggshell material/binding agent mix,
wherein the product of step (c) is a biodegradable material.

A method of processing eggshell material to provide a moulded biodegradable material; said method comprising the steps of:
  a) granulating eggshell material;
  b) contacting three parts of the granulated eggshell material with one part nanocellulose-based binding agent; and
  c) moulding and drying the granulated eggshell material/binding agent mix,
wherein the product of step (c) is a moulded biodegradable material.

As noted above, the disclosed methods of processing shell waste, may not require the use of additional aggregates such as filler materials, for example inorganic carbonates, clays or coal residues, or dispersing agents, for example maleic or citric acids.

A method of processing shell waste to provide biodegradable material, said method comprising the steps of:
  a) collection and granulation of the shell waste;
  b) preparation of the binding agent;
  c) dispersion of the shell waste within the binding agent;
  d) moulding of the shell waste/binding agent mix;
  e) formation of a dry biodegradable product.

Figure 1:
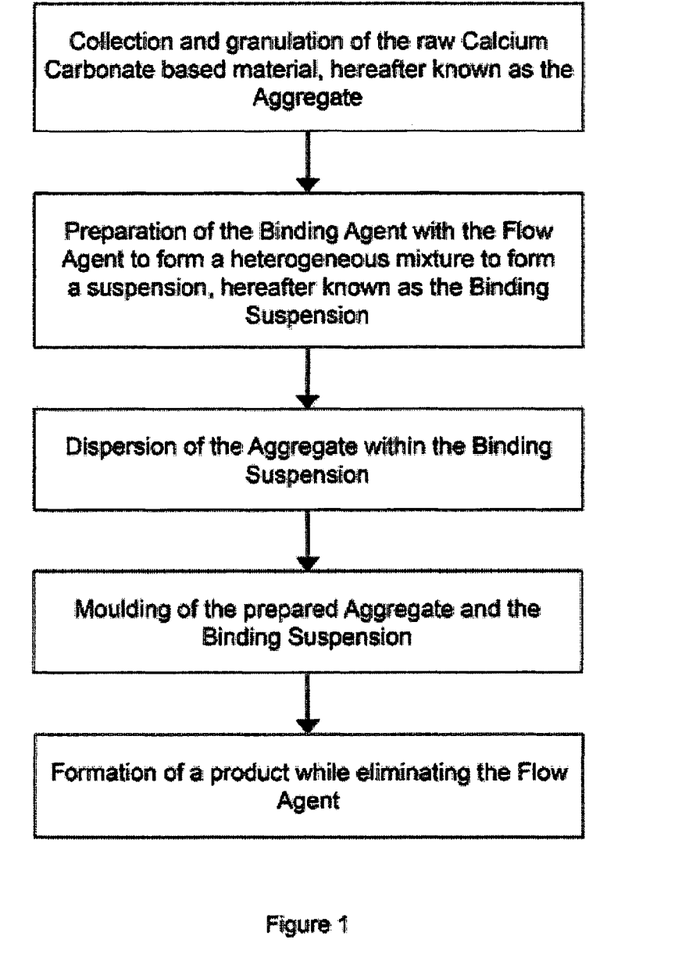
FIG. 1 presents an embodiment of the invention as a flow diagram.

An embodiment of this method is presented as a flowchart in FIG. 1 (wherein the aggregate is shell waste).

In a further aspect, the disclosure provides a material/biodegradable material obtainable by a method described herein.

The disclosure further provides use of a biodegradable material obtainable by a method described herein, in the manufacture of an object, item or tool. The object, item or tool may be selected from the group consisting of:
  (i) packing and/or packaging;
  (ii) insulation;
  (iii) cosmetic accessories; and
  (iv) tableware.

The disclosure further provides granulated egg shell for use as a cosmetic additive. For example, granulated shell material, for example granulated eggshell waste may be added to cosmetic products (gels, creams, ointments, powders and the like). Further, granulated shell material, for example granulated eggshell waste may be used as a replacement for plastic micro-beads. The granulated shell waste may be processed as described herein, moulded or prepared as micro-beads, optionally dyed with a colorant and/or coated with a hydrophobic coating and then used as a micro-bead replacement.

DETAILED DESCRIPTION

The present invention will now be described in detail with reference to the following figures which show.

EXEMPLIFICATION OF THE INVENTION

Ground eggshell powder obtained from the UK-based egg processing company JUST EGG was initially sorted into six granule size groups, using a sieve shaker:
1. >500 microns
2. 250-499 microns
3. 125-249 microns
4. 75-124 microns
5. 54-74 microns
6. <53 microns The two specific groups of granule sizes that were used for experimentation consisted of:
1. 54-249 microns
2. <53 microns Example 1: Proof of Concept Two samples were prepared by contacting the following:
1 g of eggshell powder (<53 microns); and
39 g of 1% Cellulose Micro Fibrils (CMF) solution in water, with a frequency based shaker (LabRAM).

Figure 2:
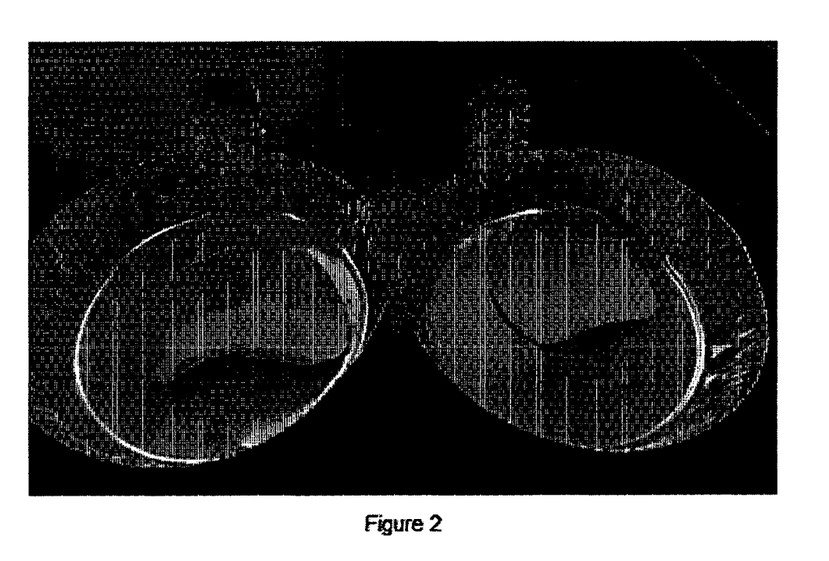
FIG. 2 is a photograph of a product obtained according to a method of the invention. In this example, a ratio of 1:0.39 eggshell (<53 μM):cellulose micro fibrils is used and the eggshell/cellulose micro fibril mix is either air dried (left sample) or oven dried (right sample).

The resulting material was divided into two cups and dried either by air drying or by oven drying. After one week, the samples had dried to form a strong and flexible cardboard-like material (see FIG. 2). Without wishing to be bound by theory, this result appeared to indicate that the cellulose fibres were able to effectively bind the calcium carbonate from eggshells.

Example 2: Optimising the Ratio of Eggshell and Cellulose

Samples were prepared according to the method used in Example 1, but with ratios of eggshell powder:CMF of 5:1, 4:1, 3:1, 2:1, 1:1, 1:2, 1:3, 1:4, 1:5.

The ratios comprising more CMF (for example, 1:2 to 1:5) produced materials that were more flexible whereas the ratios comprising more eggshell powder (for example, 5:1 to 2:1) produced materials that were more brittle but greater in strength.

Figure 3:
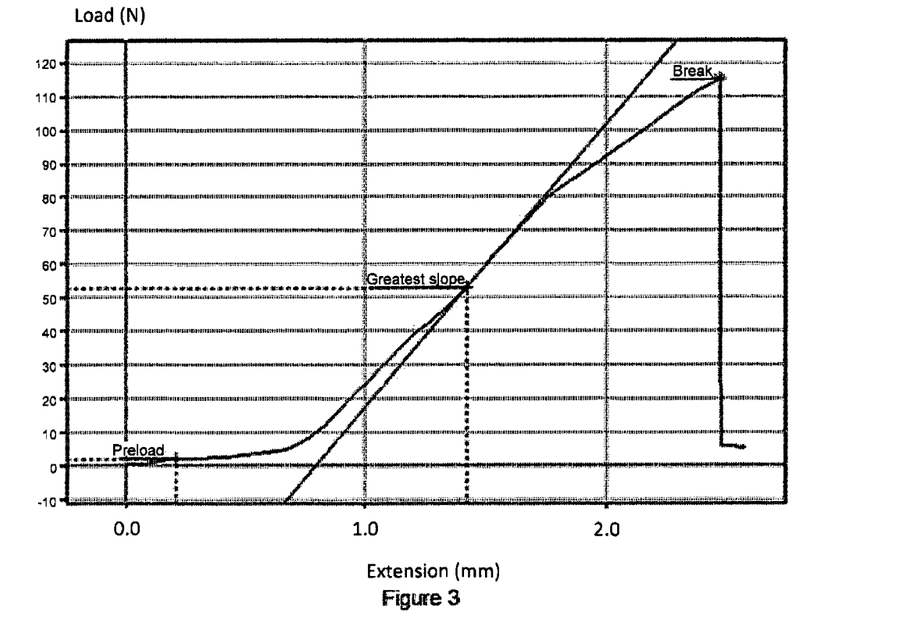
FIG. 3 is a graph of the extension (mM) as a function of the load applied (N) of a product obtained according to a method of the invention, in which a ratio of 3:1 eggshell (<53 μM):cellulose micro fibrils is used and the eggshell/cellulose micro fibrils mix is air dried.
Figure 4:
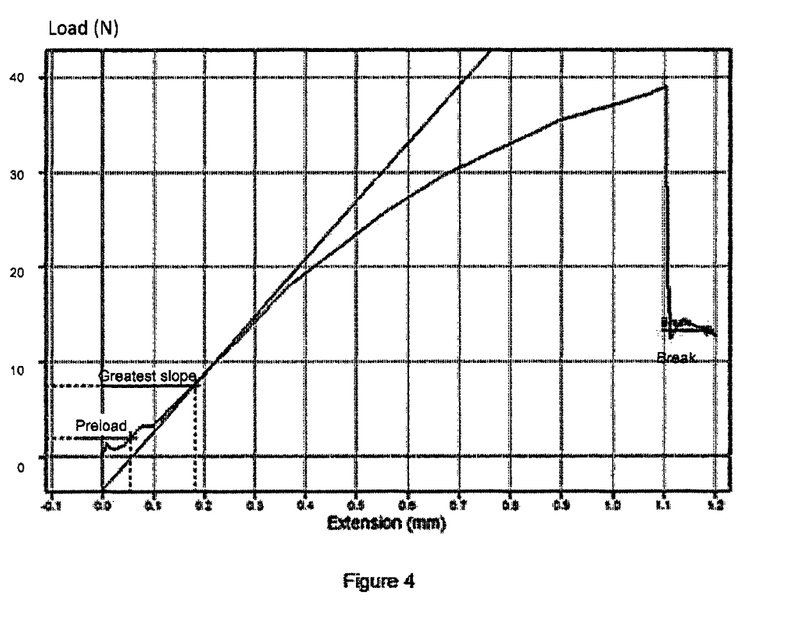
FIG. 4 is a graph of the extension (mM) as a function of the load applied (N) of a product obtained according to a method of the invention, in which a ratio of 5:1 eggshell (<53 μM):cellulose micro fibrils is used and the eggshell/cellulose micro fibrils mix is air dried.

Samples with more calcium carbonate proved to be stronger. The material with the best balance of strength and flexibility was that produced with a ratio of eggshell powder:CMF of 3:1. FIGS. 3 and 4 are graphs of the extension (mM), as a function of the load applied (N) to the material obtained according to this method, in which a ratio of 3:1 or 5:1 eggshell (<53 μM):CMF was used. The more flexible material that is produced using a ratio of 3:1 is able to stretch (extend) to a greater extent than that produced using a ratio of 5:1. This results in the more flexible material withstanding a larger load (up to approximately 115 N) before it breaks, compared with the more brittle material produced using a ratio of 5:1 (that can withstand up to approximately 38 N). A ratio of eggshell powder:CMF of 3:1 provides versatile materials that may be useful in a variety of applications.

Example 3: Freeze Drying

Samples were prepared according to the method used in Example 2, with the preferred ratio of 3:1 eggshell powder:CMF. Rather than air or oven drying, samples were frozen in a freezer and then dried using a freeze-drying machine which removes all the moisture whilst preserving the shape of the frozen sample.

Figure 5:
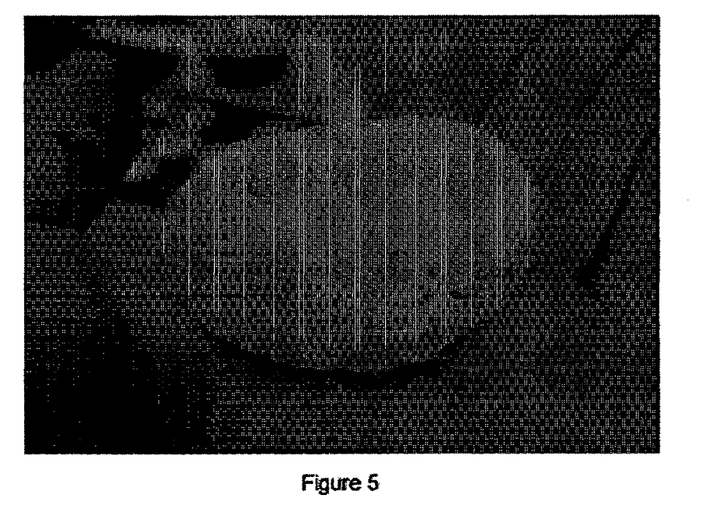
FIG. 5 is a photograph of a product obtained according to a method of the invention, in which a ratio of 3:1 eggshell (<53 μM):cellulose micro fibrils is used and the eggshell/cellulose micro fibrils mix is freeze-dried.

The resulting material (see FIG. 5) was light and fluffy, similar in texture to a cotton-pad (aerogel). This material is likely to have insulating properties and could be used as an insulating material in construction. Alternatively, it could be used as a pad in the cosmetics industry, for example for product (for example, make-up) application or removal. Once moulded into certain shapes, this material could also be used in protective packaging (replacing Styrofoam and plastic wrappers).

The same freeze drying method was also used with eggshell granule sizes of 54-249 microns. The larger particles appeared to provide a material that was prone to crumbling.

The freeze-dried material obtained with eggshell granule sizes of <53 microns was less crumbly and is a preferred material.

Example 4: Water Absorption and Hydrophobic Coatings

Samples were prepared according to the method used in Example 2, with the preferred eggshell powder:CMF ratio of 3:1. The material was tested for absorption of water. A drop of water was contacted with the material, which was absorbed after approximately 7 minutes, indicating that the material is hydrophilic.

A hydrophobic coating is necessary if the material is to withstand aqueous solutions when used in the presence of water or moisture.

Figure 6:
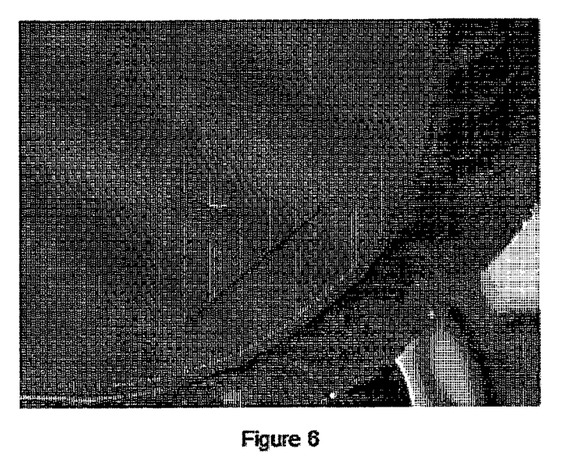
FIG. 6 is a photograph of a product obtained according to a method of the invention, in which a ratio of 3:1 eggshell (<53 μM):cellulose micro fibrils is used and the eggshell/cellulose micro fibrils mix is air dried. The sample on the right is coated with a hydrophobic solution comprising 1% polylactic acid in chloroform.

Bioplastic pellets of polylactic acid (PLA) were dissolved in chloroform to produce solutions comprising 6% and 3% PLA. The thicknesses of the bioplastic coatings that resulted on drying 10 mL, 7.5 mL and 5 mL of the 6% solution, and 10 mL of the 3% solution were compared. The thickness of the coating that resulted when 10 mL of the 3% solution of PLA was used appeared to be suitable, however this solution was too viscous to be used with a spray gun. Therefore, a 1% solution of PLA in chloroform was used, and sprayed via a spray gun onto the material samples that were prepared according to the method used in Example 2, with the preferred eggshell powder:CMF ratio of 3:1. The resulting coated materials were hydrophobic (see FIG. 6).

Application of the bioplastic coating with a spray gun is advantageous, as this coating can be applied whenever needed.

Example 5: Colouring the Material

Three natural colorants or dyes were used—red cabbage, beetroot and coffee.

Samples were prepared according to the method used in Example 2, with the preferred eggshell powder:CMF ratio of 3:1. Either waste coffee grounds or red cabbage colouring was added to each sample before drying. The colouring from the red cabbage faded as the samples dried, however the colouring from the coffee grounds remained.

Figure 7:
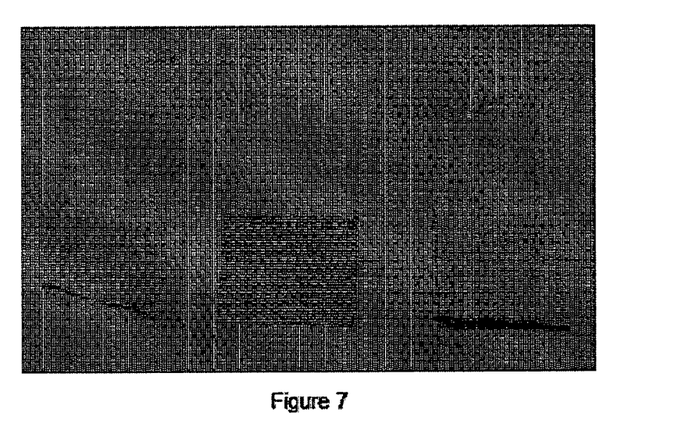
FIG. 7 is a photograph of a product obtained according to a method of the invention, in which a ratio of 3:1 eggshell (<53 μM):cellulose micro fibrils is used and the two materials are contacted and air dried. The samples are then dyed using waste coffee (left sample), beetroot waste (middle sample) and red cabbage waste (right sample).

Separate samples prepared according to the method used in Example 2, with the preferred eggshell powder:CMF ratio of 3:1, were dried prior to addition of the colorant. Colouring dry materials proved to give a vibrant and more vivid colour (see FIG. 7) and is the preferred dying method.

Example 6: Larger Granule Sizes

Samples were prepared according to the method used in Example 2, with the preferred eggshell powder:CMF ratio of 3:1, and with eggshells with granule sizes of 54-249 microns rather than <53 microns.

The resulting material was nicely formed and similar to that formed using eggshell granule sizes of <53 microns. The material differed in that it had a more coarse or rougher surface texture than that formed with the smaller eggshell granule sizes, and could prove useful in exfoliating applications.

The eggshell granules close to the 249 micron size appeared to crumble off the material on handling. Therefore, the preferred eggshell granule size is smaller than 249 microns, preferably •200 microns.

The same ratio of eggshell powder:CMF of 3:1 gave the best balance of strength and flexibility and is preferred for all eggshell granule sizes.

Example 7: Pressing and Drying the Material

Samples were prepared according to the method used in Example 2, with the preferred eggshell powder:CMF ratio of 3:1. Rather than simply air- or oven-drying, the sample was pressed in a coffee press to remove much of the water. The sample was then removed from the press and left on a paper towel to absorb the excess water, followed by oven-drying.

Figure 8:
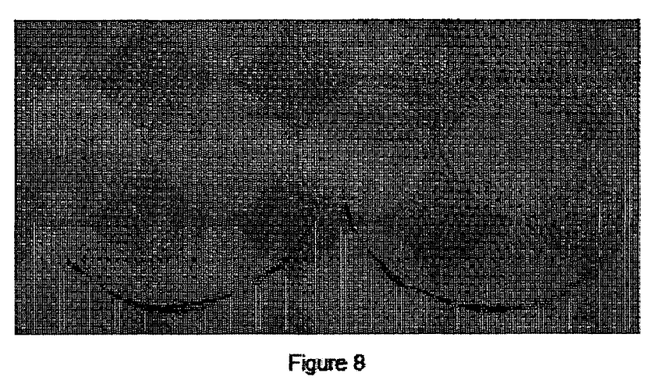
FIG. 8 is a photograph of a product obtained according to a method of the invention, in which a ratio of 3:1 eggshell (<53 μM):cellulose micro fibrils is used and the eggshell/cellulose micro fibrils mix is pressed (using a coffee press) and subjected to further moisture removal by osmosis/diffusion using paper towels.

This drying method produced similar samples as those produced with simple air- or oven-drying (see FIG. 8), but the sample dried much more quickly.

Example 8: Moulding

A plate design was produced using computer numerical control and vacuum formed into a plastic tube. Holes were drilled into the mould, which was then lined with filter paper.

The granulated shell waste/binding agent mix was prepared according to the method used in Example 2, with the preferred eggshell powder:CMF ratio of 3:1. The mix was then poured into the mould. The water separated from the mix by gravity filtration and the resulting material was dried using a hair drier. The material retained the plate shape of the mould (see FIG. 9).

Figure 9:
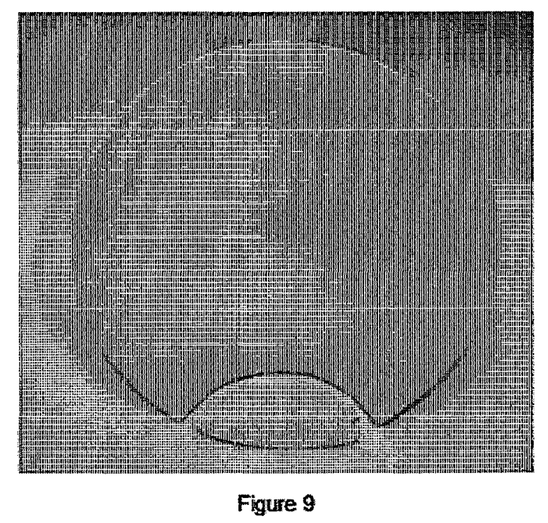
FIG. 9 is a photograph of a material obtained by a method of the invention, in which a ratio of 3:1 eggshell (<53 μM):cellulose micro fibrils is used and the eggshell/cellulose micro fibrils mix is moulded and heat dried using a hair drier. This moulded material has been used to produce a plate.

Smaller objects, for example the spork of FIG. 9, were prepared by cutting out the desired shapes from larger samples prepared according to the methods used in Example 2 and Example 7, with the preferred eggshell powder:CMF ratio of 3:1.

The invention claimed is:

1. A method of processing shell material to provide a biodegradable material, said method comprising the steps of:
   a) granulating shell material;
   b) contacting the granulated shell material with a binding agent, wherein the binding agent comprises cellulose microfibers/fibrils (CMF), cellulose nanofibers/fibrils (CNF), and nanocrystalline cellulose, and combination thereof; and
   c) drying the granulated shell material/binding agent mix to obtain a dried mix, wherein the drying step c) comprises filtering, freeze-drying, air drying, or combinations thereof;
   wherein the dried mix is a biodegradable material, wherein the shell material is selected from the group consisting of eggshell, body shell from crustaceans and body shell from molluscs, and wherein the ratio of shell material:binding agent is between 5:1 to 1:5 by weight.

2. The method of claim 1, wherein step a) further comprises separating the granulated shell material by granule size.

3. The method of claim 1, wherein the granulated shell material comprises granules less than 200 μm in size.

4. The method of claim 1, wherein the granulated shell material comprises granules less than 124 μm in size.

5. The method of claim 1, wherein the granulated shell material comprises granules less than 74 μm in size.

6. The method of claim 1, wherein the granulated shell material comprises granule sizes within any one of the ranges <53 μm, 54-74 μm, 75-124 μm, or 125-249 μm.

7. The method of claim 1, wherein the method further comprises the use of a flow agent and wherein the granulated shell material and the binding agent are further contacted with the flow agent.

8. The method of claim 7, wherein the flow agent is water.

9. The method of claim 1, wherein the binding agent is provided in the form of a suspension and wherein the granulated shell material is contacted with the binding agent suspension.

10. The method of claim 1, wherein the granulated shell material is prepared as a suspension before contacting step b) and wherein the granulated shell material suspension is contacted with the binding agent.

11. The method claim 1, wherein the method further includes a molding step.

12. The method of claim 1, wherein the shell material comprises eggshell, langoustine shell, or both.

13. The method of claim 1, wherein the binding agent is cellulose micro_fibrils (CMF), cellulose nano fibrils (CNF), or both.

14. The method of claim 1, wherein the ratio of shell material:binding agent is 5:1, 4:1, 3:1, 2:1, 1:1, 1:2, 1:3, 1:4, or 1:5 by weight.

15. The method of claim 1, wherein the method comprises an additional step of adding a dye or colorant and wherein the colorant or dye is added after drying step c).

16. The method of claim 1, wherein a hydrophobic coating is applied to the biodegradable material and the hydrophobic coating is polylactic acid.

17. The method of claim 1, wherein the method does not require the use of:
   (i) filler materials, inorganic carbonates, clays and/or coal residues;
   (ii) dispersing agents, maleic acid and/or citric acid; and/or
   (iii) synthesized calcium carbonate, natural ground calcium carbonate or surface modified calcium carbonate.

* * * * *